United States Patent [19]

Cantenot

[11] Patent Number: 4,655,666

[45] Date of Patent: Apr. 7, 1987

[54] EXTRACTION DEVICE, PARTICULARLY FOR SILOS WITH A CIRCULAR FLOOR

[76] Inventor: Laurence Cantenot, 12 avenue de la Division Leclerc, 92340 Bourg-la-Reine, France

[21] Appl. No.: 673,397

[22] Filed: Nov. 20, 1984

[30] Foreign Application Priority Data

Nov. 22, 1983 [FR] France .................................. 83 18560

[51] Int. Cl.⁴ .............................................. B65G 65/46
[52] U.S. Cl. ...................................................... 414/310
[58] Field of Search ............... 414/306, 307, 308, 309, 414/310, 311, 312

[56] References Cited

U.S. PATENT DOCUMENTS

| | | | |
|---|---|---|---|
| 3,064,831 | 11/1962 | Cook | 414/310 |
| 3,127,032 | 3/1964 | Roberts | 414/310 |
| 3,237,788 | 3/1966 | Weaver et al. | 414/307 |
| 3,338,434 | 8/1967 | Kolze | 414/307 |
| 3,519,152 | 7/1970 | Broberg | 414/306 |
| 3,536,210 | 10/1970 | Dickinson | 414/310 |
| 3,817,407 | 6/1974 | Cantenot | 414/310 |
| 3,896,943 | 7/1975 | Knutsen | 414/312 X |
| 4,099,633 | 7/1978 | Cantenot | 414/310 X |
| 4,386,695 | 6/1983 | Olson | 414/310 X |

FOREIGN PATENT DOCUMENTS 7138336  1/1973 France .
2379968 10/1978 France .............................. 414/310

Primary Examiner—Frank E. Werner
Attorney, Agent, or Firm—Fisher, Christen & Sabol

[57] ABSTRACT

An extraction device for silos with a circular floor having an opening in the form of a central funnel is disclosed. An endless screw having one end positioned centrally with respect to the opening in the silo floor is adapted to sweep angularly over the floor, bringing the product contained in the silo towards the central funnel for evacuation of the product onto a conveyor positioned beneath the floor of the silo. A cross-piece extends across the central funnel opening, providing a rigid mount for a central support. A protective cover, generally conical in form, is fixed to the central support. The protective cover overlaps the central opening and covers a first motor adapted to drive the screw about its axis. A fixed ring is connected to the protective cover. A rotating ring is mounted for rotation to the fixed ring along a circular bearing surface. The rotating ring supports the endless screw and its motor. A second motor is provided to drive the rotating ring with respect to the fixed ring for producing the angular sweeping movement of the screw across the silo floor.

2 Claims, 8 Drawing Figures

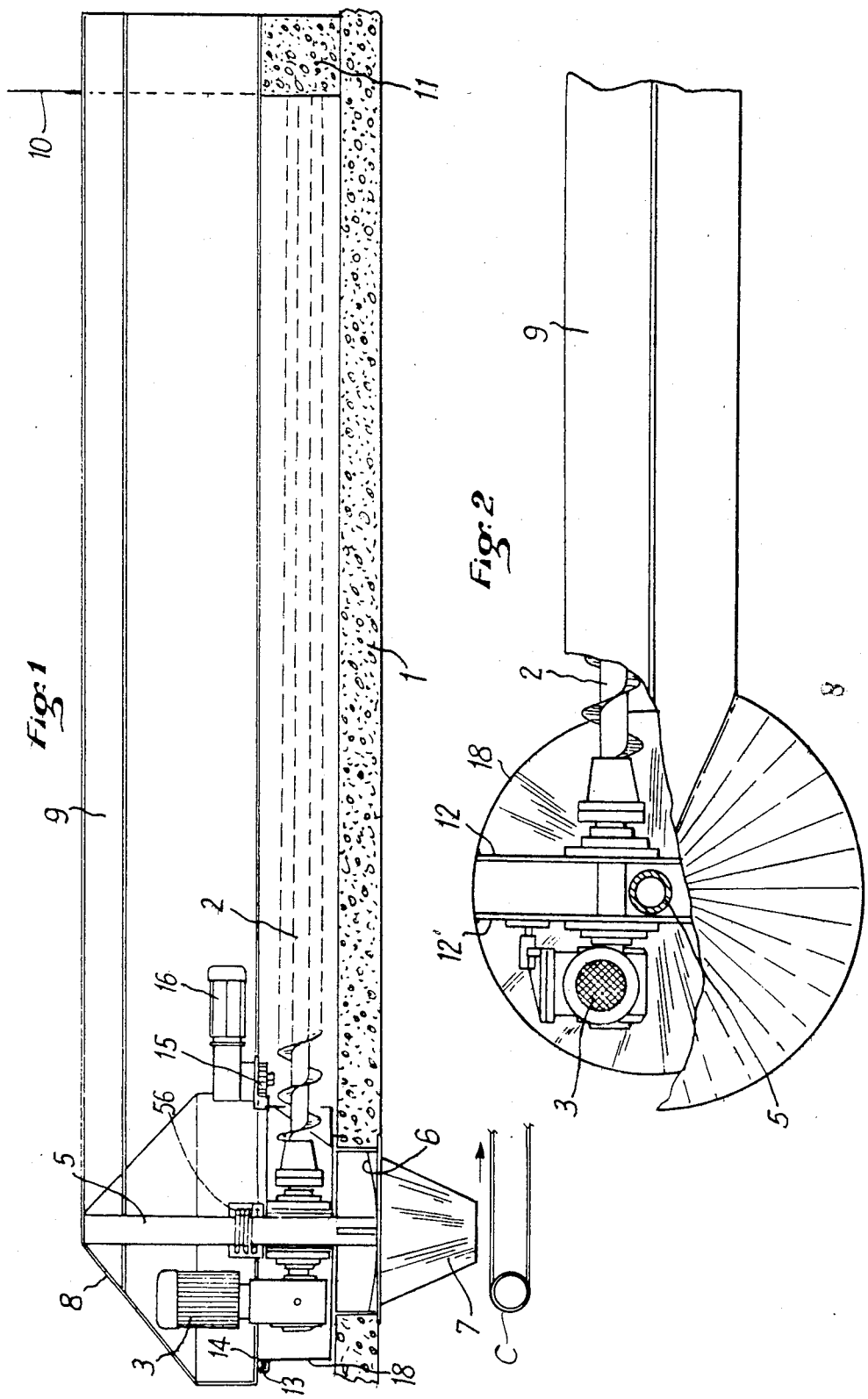

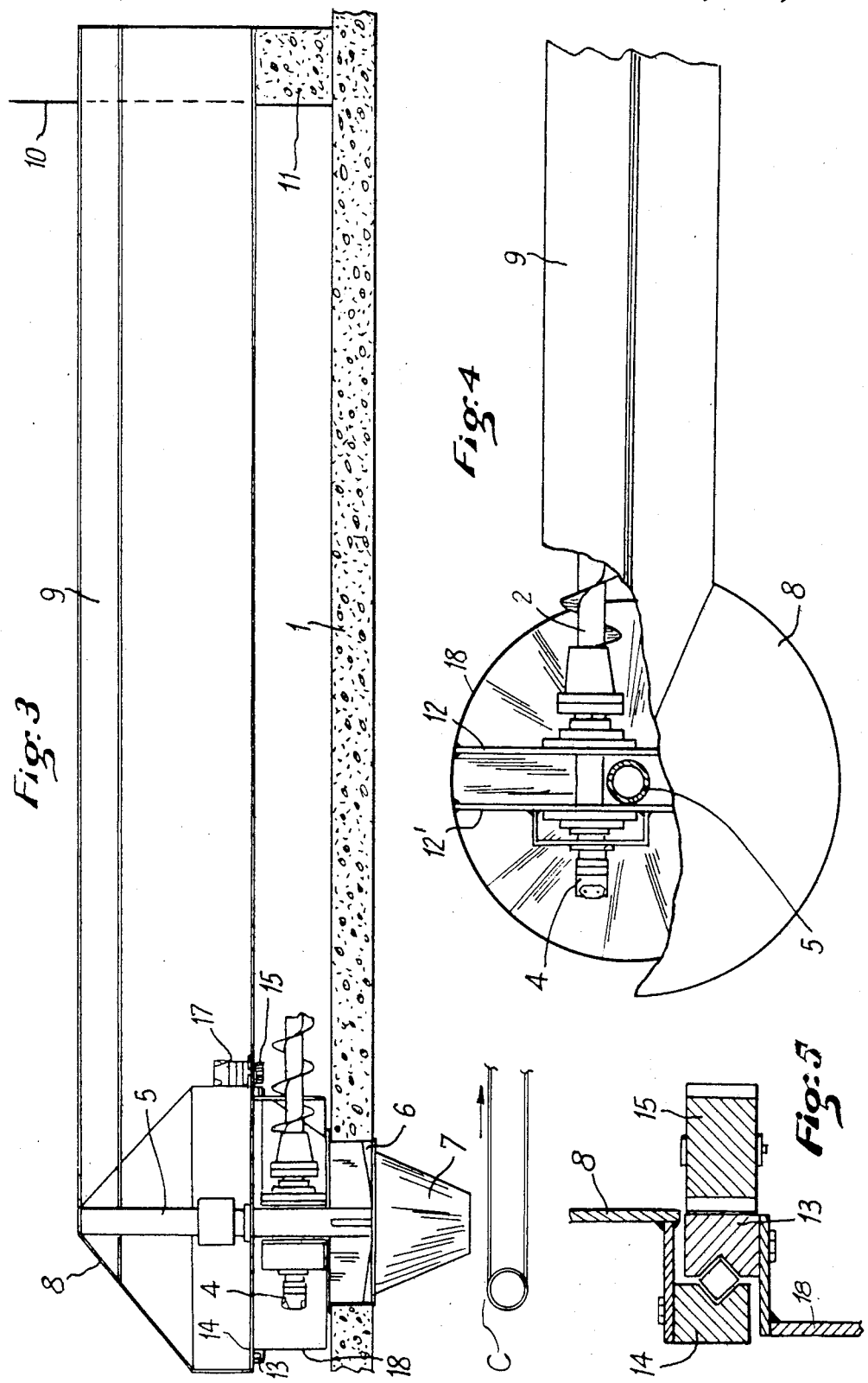

EXTRACTION DEVICE, PARTICULARLY FOR SILOS WITH A CIRCULAR FLOOR

BACKGROUND OF THE INVENTION

The present invention relates to an extraction device employing an endless screw driven in a sweeping movement over an angular path of 360° and covering the circular floor of a silo containing matter in bulk, for example granulous or pulverulent matter.

Numerous devices incorporating an Archimedean screw are known, adapted to angularly sweep over the circular floor of a silo and bringing to the centre thereof the matter taken along by the screw, said matter being evacuated at the centre through an opening, for example an evacuation funnel, towards a take-up member, for example a conveyor positioned at a level lower than the floor of the silo.

The motor for driving the endless screw is conventionally positioned plumb with the evacuation funnel and is protected by an upper protective cone on which the bulk matter lies.

Devices of this encounter the problem of finding the fulcra necessary for the motorized end of the endless screw, it being observed that the screw must be able to cover an angle of 360° so as to serve the whole of the circular floor of the silo.

Furthermore, it is also necessary to respect the maximum of free section for the passage of the matter at the evacuation opening for example at the (inverted) base of the evacuation funnel.

According to French Pat. No. 71 38336, the screw and motor system is suspended from the centre of a diametrical beam passing through the whole of the silo and of which the upturned V section protects the screw and its motor and the regular flow of the product contained in the silo. Furthermore, this system allows convenient access to the motor whilst completely freeing the section of passage of the evacuation funnel; however, this device, which had given satisfaction, is no longer suitable for large-dimensioned silos responding to present-day needs and of which the diameter, and consequently the span of the diametrical beam, exceeds ten meters, bringing about bending stresses and an excessive camber.

SUMMARY OF THE INVENTION

To this end, the present invention relates to an extraction device for silos with a circular floor, comprising:—an opening in the form of a central funnel,—a conveyor in lower position with respect to the floor of the silo,—an endless screw in substantially central position, adapted to sweep angularly over the floor, bringing the product contained in the silo towards the evacuation funnel,—a first motor adapted to drive said screw about its axis,—a central pivot,—a lower fulcrum for this pivot fast with the floor of the silo,—a protective cover, generally conical in form, fixed and resting on said pivot, said cover, substantially concentric to the central pivot, being positioned so as to overlap said motor driving the screw and the evacuation funnel, wherein said evacuation device further comprises:—a rotating ring supporting the endless screw and its motor,—a fixed ring fast with the floor of the silo and on which said rotating ring is mounted to rotate,—a second motor kinetically connected to said rotating ring bearing the screw and the first motor and the second motor driving the movement of horizontal angular sweep of the floor by the endless screw.

BRIEF DESCRIPTION OF THE DRAWINGS

The invention will be more readily understood on reading the following description with reference to the accompanying drawings, in which:

FIG. 1 shows a view in horizontal section of the radial beam of an electrically controlled extraction installation according to the invention.

FIG. 2 shows a plan view of the installation of FIG. 1.

FIG. 3 shows a view in section of the radial beam of a hydraulically controlled extraction device according to the invention.

FIG. 4 shows a plan view of the device of FIG. 3.

FIG. 5 shows a view in detail of the bearing of the housing supporting the motorized screw.

DESCRIPTION OF THE PREFERRED EMBODIMENT

Figure 6:
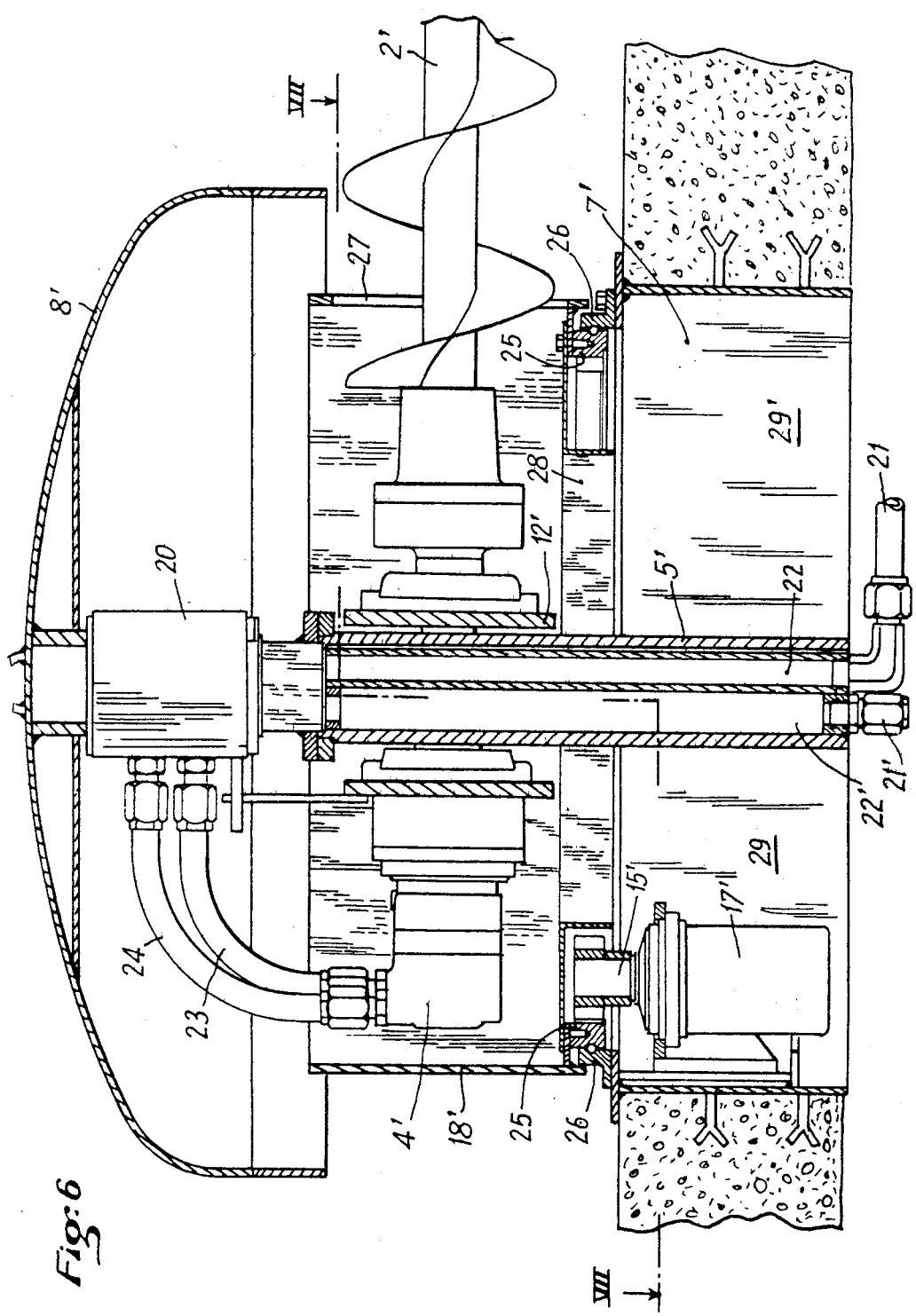
FIG. 6 shows a view in vertical section of a variant embodiment of the device, along line VI—VI of FIG. 7.

Referring now to the drawings, FIGS. 1 to 4 show that extraction is effected, in manner known per se, immediately above the floor 1 of the silo, by an endless screw 2 disposed radially at the base of the silo and driven either by an electric motor 3 provided with a reduction gear (FIGS. 1 and 2) or by a hydraulic motor 4 (FIGS. 3 and 4).

A central pivot or vertical shaft 5 rests on a cross-piece 6 anchored at the top of the central evacuation funnel 7. Positioned below central funnel 7 is a conveyor c, partially and schematically shown, that is used for conveying the matter flowing from central funnel 7 to a suitable location outside the silo.

The cross-piece 6 allows firm anchorage of the central pivot 5. However, the pivot may be erected from the infra-structure without bearing on the walls of the funnel.

The top of the pivot 5 is fast, in manner known per se, with a protective cover or cone 8, and this cone is itself held firmly by the radial beam 9.

This beam 9 is, in manner known per se, of upturned V section, consequently allowing the matter contained in the silo to flow on either side of the radial beam. It joins the peripheral wall 10 of the silo and its outer end is anchored on a cement base 11.

Its central end is rendered fast, for example by welding, with the conical outer wall of the protective cover 8.

In this way, the central pivot 5 is held at its base and at its top, which ensures firm positioning and anchorage thereof, so that it can withstand the efforts and stresses of the movement of the screw both in its rotation about its axis taking along the matter and in its horizontal sweeping movement angularly passing over the base of the silo at floor 1 level.

The screw/motor assembly is positioned tangentially with respect to the fixed central pivot 5, the tangential axis of the motorized screw itself being driven in its horizontal sweeping movement about the central axis constituted by the pivot 5.

To this end, the screw 2/motor 4 assembly, in the example shown, is mounted fast with a rotating cylindrical housing 18, via crosspieces 12, 12'.

The top of the cylindrical housing 18 is fast with the outer ring gear 13 mounted, via a roller bearing, on a fixed concentric ring 14, itself fast with the fixed structure constituted by the base of the conical cover 8.

The rotating ring 13, concentric and in abutment on the fixed ring 14, is subject to the action of a drive member, for example of a pinion 15 driven by an electric or hydraulic drive unit 16 or 17 respectively.

The pinion 15 rotates the ring gear 13, consequently rotating in a horizontal plane the whole of the rotating structure formed by the cylindrical housing 18 supporting the screw 2 and its motor, thus ensuring angular sweep, about the vertical axis of the pivot 5, over the base of the silo at floor 1 level, this movement being accompanied by the rotation of the screw on itself driven by its electric or hydraulic motor 3 or 4 respectively.

Pipes (not shown) may be arranged inside the top of the radial beam 9, for the passage of cooling fluid in order to evacuate the calories from the interior of the protective cover 8 where heat is emitted by the electric motors 3 in particular.

Where a hydraulic motor is used (FIGS. 3 and 4), the calories may be evacuated by the hydraulic circuits themselves.

However, the beam also protects the channels conducting the driving force from the outside up to the system for driving the screw and constituted by electrical cables joining the motor 3 via rotating contacts 56; if a hydraulic drive unit 4 is used (FIGS. 3 and 4), the passage between the motor 4 rotating about axis 5 and the fixed supply and return of hydraulic fluid may be obtained in conventional manner by using revolving joints.

Figure 7:
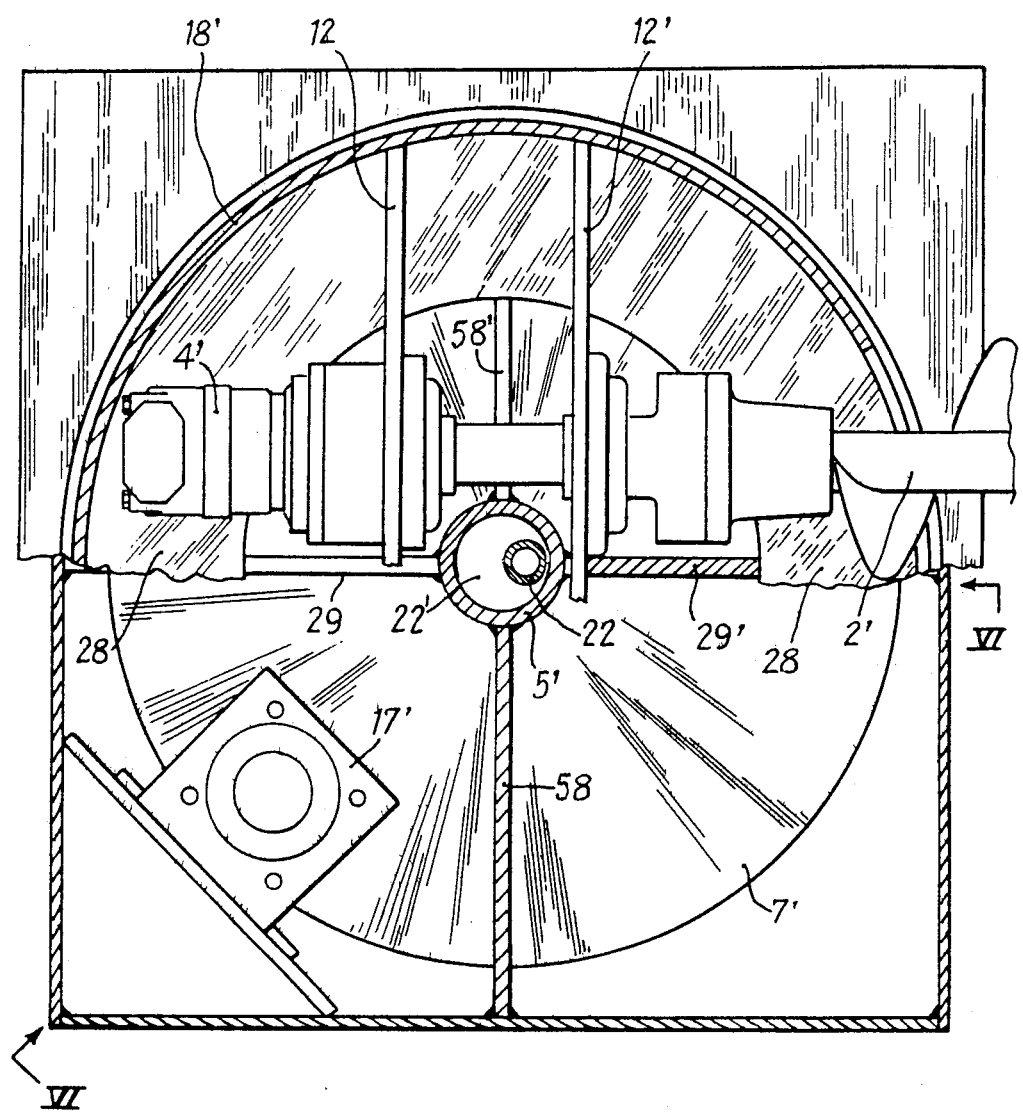
FIG. 7 shows a plan view along two levels of the device of FIG. 6.

FIGS. 6 and 7 show a variant embodiment in which the protective cover 8' which, here, is a cover with a bottom of generally parabolic section extended by cylindrical edges, is mounted on the fixed central 25 pivot 5' with which it is fast, without being connected to the wall of the silo by a beam as in the preceding examples.

Motorization of the screw 2' is ensured by a hydraulic motor 4' mounted in a rotating structure constituted by the cylindrical housing 18' to which the motor 4' is connected by cross-pieces 12, 12' joining two diametrically opposite edges of the cylinder 18'; it will be specified that FIG. 7 distinguishes the two upper and lower halves of the device; the plan view of FIG. 7 corresponds to a horizontal section taken along line VII—VII of FIG. 6; whilst the view in section of FIG. 6 shows a vertical section along line VI—VI of FIG. 7.

As the supply of motor 4' cannot follow the radial beam which here does not exist, supply from the infrastructure has been provided in this embodiment.

The revolving joint is found again, illustrated here in greater detail under reference 20, and allowing supply of the motor 4' supported by the rotating ring 18' from the fulcrum constituted by the central pivot 5'.

The supply conduits 21 and 21' corresponding for example to the intake and return of the hydraulic fluid, pass through the infrastructure of the silo and open out in the pipes inside the pivot 5' and constituted by the sheath 22 and the space 22' within the cylindrical pivot 5'; beyond the revolving joint 20, the flexible cables 23 and 24 join the motor 4'.

The cylinder 18' constituting the rotating housing supporting the screw 2'/motor 4' assembly is here in rotary abutment on a lower bearing.

The ring gear 25 is mounted at the base of the cylinder 18' and is mounted to rotate on the fixed outer ring 26, for example via a ball or roller bearing of known type.

The fixed ring is positioned in peripheral position with respect to the edge of the funnel 7' and it is fast with the floor of the silo.

The mobile ring gear 25 supporting the rotating cylindrical housing 18' may be driven in rotation by the pinion 15', itself moved from the motor 17' which may be a hydraulic motor; as the motor 17' is fixed, it may be supplied via fixed conduits (not shown).

The motor 17' thus rotates the pinion 15' which provokes the rotating movement of the structure constituted by the cylindrical housing 18' supporting the screw 2'/motor 4' assembly, thus provoking the sweeping movement over the floor of the silo, conducting the granulous or pulverulent matter taken along by the screw 2' towards the centre of the silo and evacuating said matter via the funnel 7'.

The cylinder 18' comprises a passage or opening 27 in its wall to allow rotation of the screw 2' and centripetal drive of the matter.

The rotating ring gear 25 and the pinion 15' are protected from contamination by the pulverulent matter during evacuation by the partition of revolution 28.

It is understood that the central cylindrical pivot 5' may contain, internally, conduits for conducting the supply current in the case of an electric motor driving the screw and, in this case, passage from the fixed central pivot 5' towards the motor is effected via rotating contacts; the central pivot 5' may also contain, internally, conduits for the admission of streams of fresh air to cool the motors.

Pivot 5' rests on the spider constituted by cross-pieces 58, 58, 29, 29'.

Figure 8:
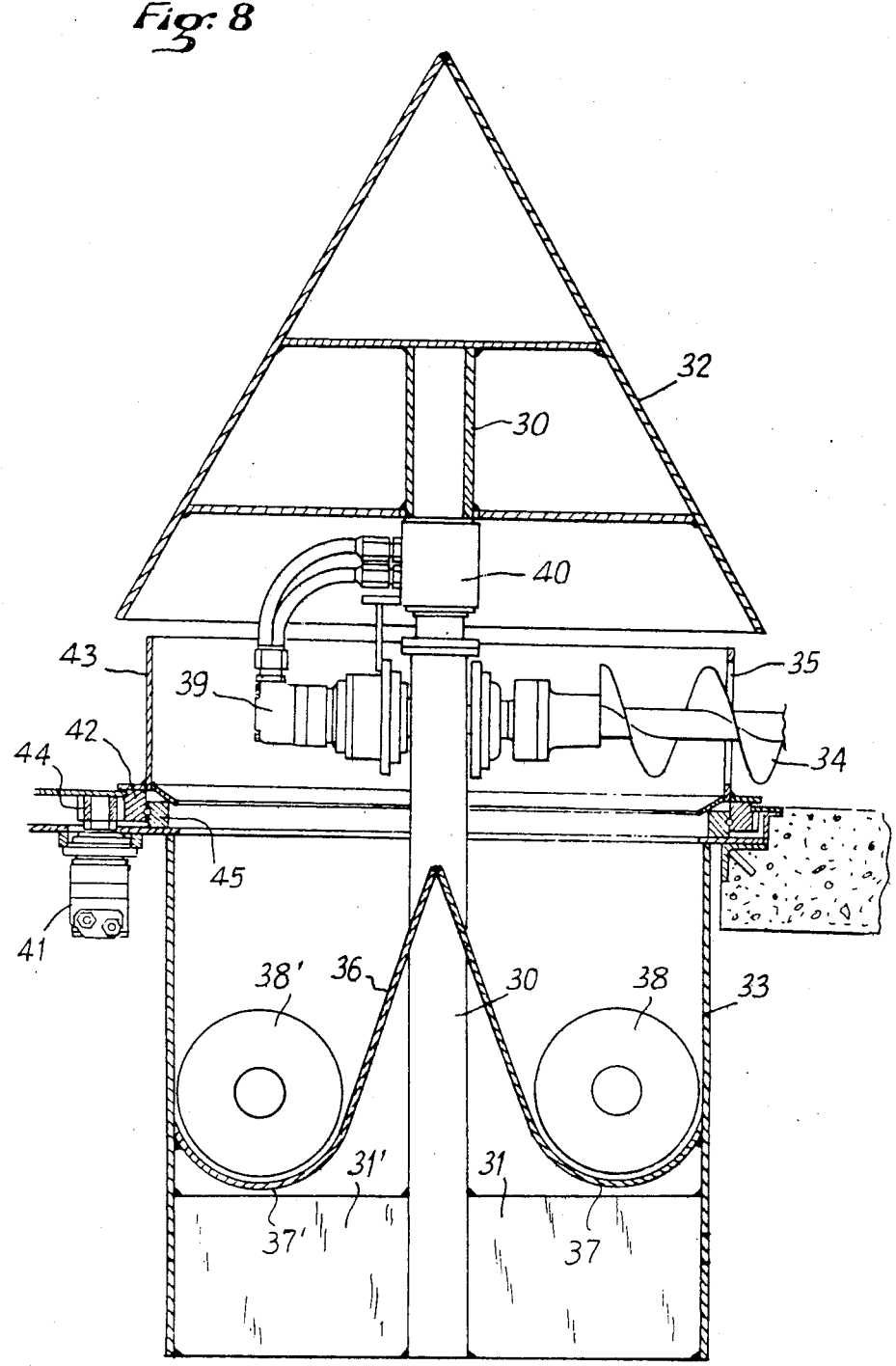
FIG. 8 shows a view in vertical section of variant embodiment.

FIG. 8 shows a variant in which the central pivot 39 is anchored at its base in the structure constituting the floor of the silo. The pivot 30 is firmly maintained by an assembly of cross-pieces 31, 31' together forming a spider which ensures firm and correct positioning and anchorage of the central tubular pivot 30.

In this embodiment, the pivot 30 is effectively erected from its base up to the top supporting the protective cover 32 and it is firmly maintained by its anchorage on the cross-pieces 31 and 31' themselves fast with the walls 33 of the central evacuation well; in this way, the zone of passage which allows evacuation of the products conducted by the screw 34 is not encumbered; in this case, the matter passes through the opening 35 and flows into the evacuation well defined by the cylindrical wall 33.

The well defined by the cylinder 33 is itself divided by the median partition 36 into two semi-cylindrical beds 37 and 37' each served by a screw 38, 38' which conducts the matter poured from the upper part towards the outside.

In this embodiment, the circuits serving the hydraulic motor 39 pass, as described hereinbefore, inside the central pivot 30 and terminate at the revolving joint 40.

In the embodiment described here, the motor 41 provided for driving the housing 42 is disposed outside with respect to the well 33, which makes it possible to clear the zone of passage for evacuation; in this case, the ring 42 fast with the cylindrical housing 43 and attacked by the pinion 44 fast with the drive motor 41, rests on the inner ring 45 via ball bearing.

What is claimed is:

1. An extraction device for silos with a circular floor having a central opening in the form of a central funnel, comprising:
    - a conveyor in a lower position with respect to the floor of the silo,
    - an endless screw extending from the center of the floor to adjacent the wall of the silo, adapted to sweep angularly over the floor, bringing the product contained in the silo towards said central funnel,
    - a first motor adapted to drive said screw about its axis,
    - a central support,
    - a cross-piece extending across said central opening and fixedly mounted to the floor of the silo for rigidly mounting said central support to the floor of the silo,
    - a protective cover, generally conical in form, fixed to and resting on said central support, said cover being substantially concentric to said central support, and being positioned so as to overlap said first motor and said central funnel,
    - a rotating ring supporting said screw and said first motor, said rotating ring being fixed to a housing having an outer sidewall that substantially overlaps said central opening and terminates in the vicinity of said central opening,
    - a fixed ring on which said rotating ring is mounted to rotate, said fixed ring being fixed to the lower edge of said cover,
    - roller bearing means interposed between said rotating ring and said fixed ring,
    - a second motor drivingly connected to said rotating ring for driving said screw horizontally in angular sweeping movement across the floor of the silo,
    - a radial beam having an upturned V-section and fixedly mounted on one side to the wall of the silo and on the other side to said cover,
    - at least one conduit of cooling fluid opening out at one end to the outside of the silo and leading at the other end to the zone constituted by the interior space of said cover, said conduit allowing evacuation of calories emitted by said first and said second motors.

2. The device of claim 1, wherein said housing is generally cylindrical in form, substantially concentric to said central support, and provided with an opening in said sidewall for the passage of said screw and the matter taken along thereby towards said central funnel.

* * * * *